United States Patent
Hennig (10) Patent No.: US 10,696,106 B2
(45) Date of Patent: Jun. 30, 2020

(54) ROTARY UNION FOR AUTOMATIC TIRE INFLATION SYSTEM

(71) Applicant: Equalaire Systems, Inc., Corpus Christi, TX (US)

(72) Inventor: Mark Kevin Hennig, Corpus Christi, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 256 days.

(21) Appl. No.: 15/030,566

(22) PCT Filed: Oct. 23, 2014

(86) PCT No.: PCT/US2014/061879
§ 371 (c)(1),
(2) Date: Apr. 19, 2016

(87) PCT Pub. No.: WO2015/061523
PCT Pub. Date: Apr. 30, 2015

(65) Prior Publication Data
US 2016/0250901 A1    Sep. 1, 2016

Related U.S. Application Data

(60) Provisional application No. 61/894,653, filed on Oct. 23, 2013.

(51) Int. Cl.
*B60C 23/00* (2006.01)
*B60B 7/00* (2006.01)

(52) U.S. Cl.
CPC .......... *B60C 23/003* (2013.01); *B60B 7/0013* (2013.01)

(58) Field of Classification Search
CPC ............................ B60C 23/003; B60C 23/001
USPC ................................. 152/416, 417, 418, 415
See application file for complete search history.

(56) References Cited

U.S. PATENT DOCUMENTS

| | | |
|---|---|---|
| 839,626 A | 12/1906 | Nielsen |
| 2,685,906 A | 8/1954 | Williams |
| 3,276,503 A | 10/1966 | Kilmarx |
| 4,685,501 A | 8/1987 | Williams |
| 4,883,106 A | 11/1989 | Schultz et al. |
| 5,161,644 A | 11/1992 | Swenskowski et al. |
| 5,174,839 A | 12/1992 | Schultz et al. |
| 5,287,906 A | 2/1994 | Stech |
| 5,377,736 A | 1/1995 | Stech |
| 5,429,167 A | 7/1995 | Jensen |
| 5,482,358 A | 1/1996 | Kuck |

(Continued)

OTHER PUBLICATIONS

International Preliminary Report on Patentability issued in corresponding PCT/US2014/061879 dated Apr. 26, 2016 (8 pages).

(Continued)

*Primary Examiner* — Scott A Browne
(74) *Attorney, Agent, or Firm* — Pizarro Allen PC (57) ABSTRACT

A rotary union for a tire inflation system may comprise a stator and a rotor assembly, and may be contained entirely within the space formed by a hubcap and wheel end. The rotor assembly may be mounted to the interior of a hubcap. The rotor assembly may comprise a tube that extends into the stator. The tube may be sealed in the rotor assembly by a first annular seal, and may be sealed in the stator by a second annular seal.

14 Claims, 8 Drawing Sheets

(56) References Cited

U.S. PATENT DOCUMENTS

| | | | |
|---|---|---|---|
| 5,769,979 A * | 6/1998 | Naedler | B60C 23/003 |
| | | | 152/417 |
| 6,105,645 A * | 8/2000 | Ingram | B60C 23/003 |
| | | | 152/415 |
| 6,131,631 A | 10/2000 | Bradley et al. | |
| 6,145,559 A | 11/2000 | Ingram, II | |
| 6,244,316 B1 * | 6/2001 | Naedler | B60C 23/003 |
| | | | 152/417 |
| 6,260,595 B1 | 7/2001 | Cobb | |
| 6,325,124 B1 | 12/2001 | Colussi et al. | |
| 6,394,159 B1 | 5/2002 | Cobb | |
| 6,425,427 B1 | 7/2002 | Stech | |
| 6,484,774 B1 | 11/2002 | Naedler | |
| 6,651,689 B1 | 11/2003 | Stech | |
| 6,698,482 B2 | 3/2004 | Hennig et al. | |
| 6,871,683 B2 | 3/2005 | Cobb | |
| 7,207,365 B2 | 4/2007 | Nelson et al. | |
| 7,273,082 B2 | 9/2007 | White et al. | |
| 7,530,379 B1 | 5/2009 | Becker et al. | |
| 7,669,465 B2 | 3/2010 | Becker | |
| 7,963,159 B2 * | 6/2011 | Ingram | B60C 23/003 |
| | | | 73/146 |
| 8,327,895 B2 | 12/2012 | Stech | |
| 8,505,600 B2 | 8/2013 | Padula et al. | |
| 8,869,850 B2 | 10/2014 | Stech | |
| 9,221,308 B2 | 12/2015 | Nelson et al. | |
| 9,358,832 B2 | 6/2016 | Helmer et al. | |
| 9,636,954 B2 | 5/2017 | Therber et al. | |
| 2004/0000364 A1 * | 1/2004 | Hennig | B60C 23/003 |
| | | | 152/417 |
| 2004/0238093 A1 | 12/2004 | Nelson et al. | |
| 2005/0194079 A1 * | 9/2005 | Hennig | B60C 23/003 |
| | | | 152/417 |
| 2009/0283190 A1 | 11/2009 | Padula et al. | |
| 2012/0024445 A1 | 2/2012 | Wilson et al. | |
| 2013/0199685 A1 * | 8/2013 | Nelson | B60C 29/00 |
| | | | 152/415 |

OTHER PUBLICATIONS

Notification of the First Office Action issued in counterpart Chinese Patent Application No. 201480058059.4 dated Dec. 26, 2016 (20 pages).

Communication of the extended European search report and search opinion issued in counterpart European Patent Application No. 14856099.8 dated Feb. 24, 2017 (7 pages).

Patent Examination Report No. 1 issued in counterpart Australian Patent Application No. 2014340018 dated Oct. 19, 2016 (4 pages).

Opening Markman Brief (U.S. Pat. No. 5,769,979) of Pressure Systems International, Inc. and Equalaire, Inc., filed in. *Airgo IP, LLC v. Arvinmeritor, Inc. et al.*, United States District Court for the Western District of Oklahoma, Case No. 05-CV-01405, Nov. 6, 2006 (28 pages).

Plaintiffs Airgo IP, LLC, and Airgo Systems, LLC Opening Claim Construction Brief, filed in *Airgo IP, LLC v. Arvinmeritor, Inc. et al.*, United States District Court for the Western District of Oklahoma, Case No. 05-CV-01405, Nov. 6, 2006 (41 pages).

Plaintiffs Airgo IP, LLC, and Airgo Systems, LLC Response to Counter-Plaintiffs Pressure Systems International, Inc., and Equalaire Systems, Inc. Opening Claim Construction Brief, filed in *Airgo IP, LLC v. Arvinmeritor, Inc. et al.*, United States District Court for the Western District of Oklahoma, Case No. 05-CV-01405, Nov. 27, 2006 (28 pages).

Response of Defendants/Counter-Plaintiffs Arvinmeritor, Inc., Pressure Systems International, Inc. and Equalaire, Inc. to Plaintiffs/Counter-Defendants Airgo IP, LLC, and Airgo Systems, LLC's Opening Claim Construction Brief, filed in *Akirgo IP, LLC v. Arvinmeritor, Inc. et al.*, United States District Court for the Western District of Oklahoma, Case No. 05-CV-01405, Nov. 27, 2006 (31 pages).

Order (Markman Ruling) filed in *Airgo IP, LLC v. Arvinmeritor, Inc. et al.*, United States District Court for the Western District of Oklahoma, Case No. 05-CV-01405, Feb. 23, 2007 (18 pages).

* cited by examiner

ROTARY UNION FOR AUTOMATIC TIRE INFLATION SYSTEM

CROSS-REFERENCE TO RELATED APPLICATIONS

This application claims priority to International Application No. PCT/US2014/061879 filed Oct. 23, 2014, which claims priority to U.S. Provisional Patent Application No. 61/894,653 filed on Oct. 23, 2013. The entire disclosures of the aforementioned applications are incorporated herein by reference.

FIELD

The disclosed method and apparatus generally relate to vehicle tire inflation systems.

BACKGROUND

There exists a need for a method and apparatus for an improved rotary union for vehicle tire inflation systems.

SUMMARY

A rotary union may comprise a stator having a first fluid channel disposed therethrough; a first annular seal disposed within the first fluid channel; a rotor body having a second fluid channel disposed therethrough, the rotor body being configured for removable mounting to the interior of a hubcap, the hubcap having a third fluid channel disposed in the hubcap, such that the second fluid channel is in sealed fluid communication with the third fluid channel when the rotor body is mounted to the hubcap; a second annular seal disposed in the second fluid channel; and a tube sealingly disposed in the first annular seal and the second annular seal. A rotary union may comprise a stator; and a rotor assembly comprising a rotor body and a tube sealingly disposed in the rotor body, wherein the tube is sealingly coupled to the stator, wherein the rotor assembly is configured for removable mounting to the interior of a hubcap. A rotary union may comprise a stator; and a rotor assembly comprising a hub cap and a tube sealingly and rotatably disposed in the interior of the hubcap, wherein the tube is sealingly and rotatably coupled to the stator. A rotary union may comprise a stator; and a tube sealingly and non-rotatably disposed in the interior of a hubcap, wherein the tube is sealingly and rotatably coupled to the stator.

A vehicle tire inflation system may comprise a fluid source; and a rotary union in sealed fluid communication with the fluid source and configured for removable mounting to the interior of a hubcap. A vehicle tire inflation system may comprise a fluid source; and a hubcap comprising a first fluid channel and a rotary union, the rotary union disposed within the interior of the hubcap and in sealed fluid communication with the first fluid channel and with the fluid source, the rotary union comprising a tube having an end disposed within the hubcap; and an annular seal disposed between the tube and the hubcap so as to form a sealing interface between the tube and the hubcap. A vehicle tire inflation system may comprise a fluid source; a stator comprising an annular seal, the stator in sealed fluid communication with the fluid source; a hubcap comprising a first fluid channel; a tube non-rotatably mounted to the hubcap, the tube having a first end in sealed fluid communication with the first fluid channel and a second end sealingly and rotatably disposed within the annular seal; and a first fluid conduit having a first end in sealed fluid communication with a first vehicle tire and a second end in sealed fluid communication with the first fluid channel.

A hubcap having a fluid channel may comprise an annular seal disposed in the fluid channel; and a tube located within the interior of the hubcap, and having an end sealingly and rotatably disposed within the annular seal. A hubcap having a fluid channel may comprise a tube extending into the interior of the hubcap and in sealed fluid communication with the fluid channel, the tube being fixed against rotation with respect to the hubcap.

DETAILED DESCRIPTION

Figure 1:
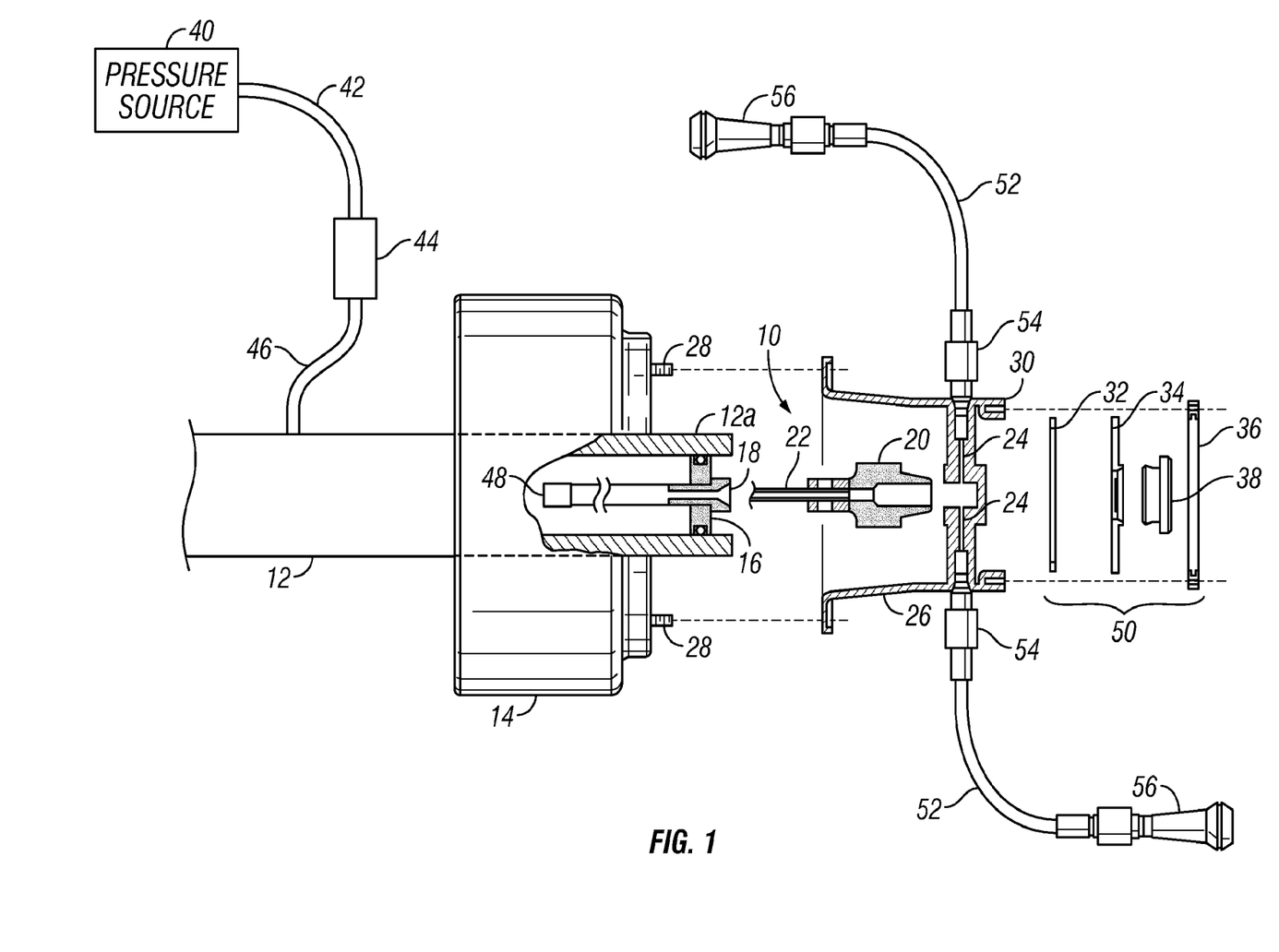
FIG. 1 illustrates one embodiment of a rotary union for a tire inflation system.

FIG. 1 illustrates an exemplary rotary union 10 provided at the wheel end of a vehicle, such as a commercial truck or trailer. In the example of FIG. 1, a hollow trailer axle 12 may have a hub 14 mounted thereto as is known in the art. The hollow axle 12 may be sealed at each end 12a with a plug 16, such as a press plug. The rotary union 10 may comprise a stator 18, which may be sealingly mounted in the plug 16, and a rotor assembly 20. The rotor assembly 20 may comprise a tube 22 of sufficient length to extend into the stator 18. The rotor assembly 20 may be mounted to a hubcap 26. In particular, the rotor assembly 20 may be mounted to the interior of a hubcap so that the rotary union 10 is entirely contained within the space formed by the hubcap and wheel end.

The hubcap 26 may comprise one or more fluid channels 24 radiating away from a center through which fluid, such as pressurized air, may be communicated. The hubcap 26 may be sealingly mounted to the hub 14 by the lug nuts 28. The hubcap 26 may be sealed at hub circumference 30 by a gasket 32, sight glass 34 and retainer ring 36. The sight glass 34 may include a plug 38. In other embodiments, the plug 38 may be mounted in the retainer ring 36 and extend through the sight glass 34. The plug 38 may in some embodiments comprise a pressure relief valve or an opening to relieve fluid pressure that may build up in the hubcap 26. Such a plug 38 may, for example, be a Sentinel™ ESP plug or Sentinel™ ESP filter vent made by Stemco.

When assembled with the wheel end, the tube 22 of the rotor assembly 20 may sealingly extend into the stator 18. The rotor assembly 20 may be sealingly mounted to the hubcap 26, such as by NPT threads or straight threads or an o-ring boss seal. The hubcap 26 may be mounted to the hub 14. The sight glass assembly 50 may be sealingly mounted to the hubcap 26 by, e.g., screws (not shown).

The rotary union 10 may be used in connection with a tire inflation system, such as an automatic tire inflation system made by Pressure Systems International, Inc. Of course, the disclosed rotary union may be used with any other suitable tire inflation system, whether for sealed axles or unsealed axles, solid or hollow, or trailer, drive or steer axles. In the embodiment illustrated in FIG. 1, pressurized fluid (which may, for example, be air, nitrogen and/or other tire pressurizing fluid) may flow from a pressure source 40 through a conduit 42 to a pressure regulator 44, which may adjust the pressure of the fluid to a pressure suitable for tire inflation, such as 110 psi. The fluid may flow from the pressure regulator 44 through conduit 46 to axle 12. The fluid may flow through the axle 12 to the stator 18. A filter 48 may remove particles from the fluid before the fluid enters the stator 18. The fluid may flow through the stator 18 into the tube 22 of the rotor assembly 20. The fluid may flow from the rotor assembly 20 through the fluid channels 24 to hoses 52 connected to the hubcap via fittings 54. The hoses 52 may be connected to tire valves 56 so as to allow fluid to flow into tires (not shown). Thus, the rotary union 10 may allow pressurized fluid to flow from the pressure source 40 to the tires regardless of whether the vehicle is moving. The hubcap 26 and part of the rotary union assembly 20 may rotate with the vehicle tire (not shown), which may be mounted to a wheel (not shown) mounted to the hub 14.

Figure 2:
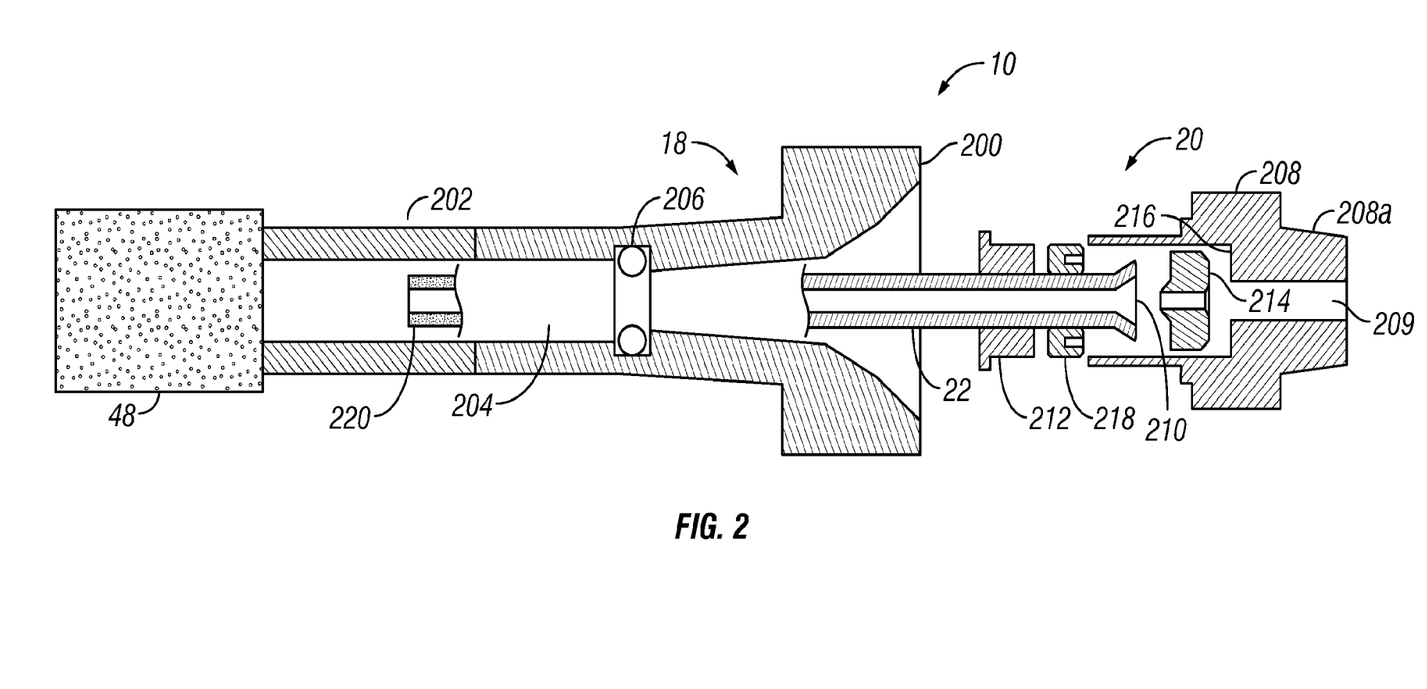
FIG. 2 illustrates a detailed view of the rotary union of the embodiment of FIG. 1.

FIG. 2 provides a more detailed view of the rotary union 10 embodiment of FIG. 2. As may be seen in the embodiment of FIG. 2, the stator 18 may comprise a head 200 and a stator tube 202 that form a stator fluid channel 204. A filter 48 may be mounted at one end of the stator tube 202 to remove larger debris particles from the pressurizing fluid. An annular seal 206 may be disposed within a groove about the diameter of the fluid channel 204. The annular seal 206 may be an o-ring, lip seal or any other suitable seal configuration, and may comprise a variety of materials, such as rubber, silicone, nylon, oilite or graphite. The annular seal 206 may be configured to seal the tube 22 within the stator 18 when the tube 22 is inserted into the stator 18.

Figure 7:
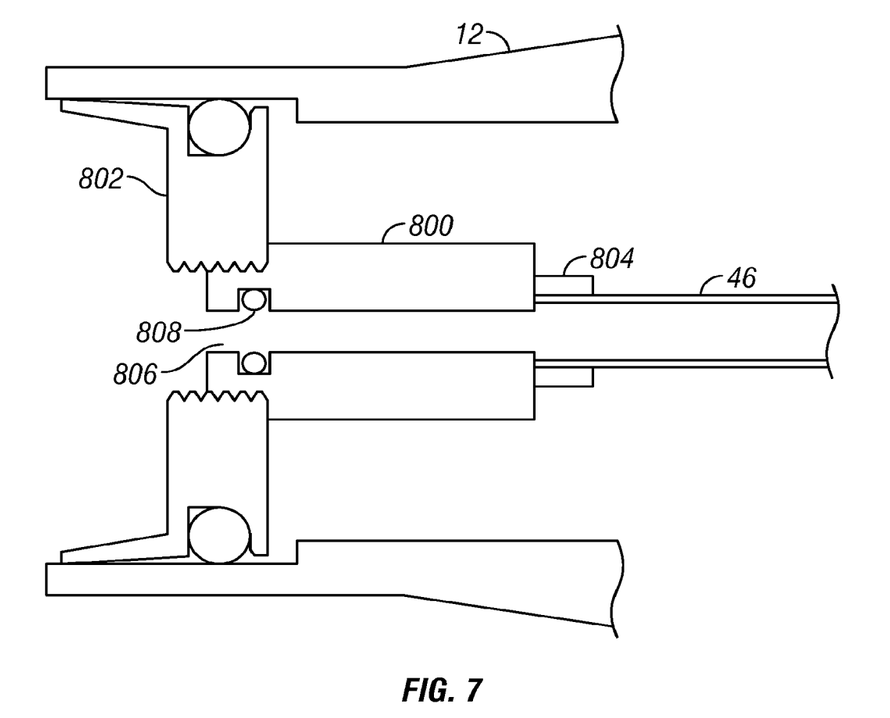
FIG. 7 illustrates a stator having a fluid conduit connected thereto for sealing connection to a fluid pressure source.

In other embodiments, a stator may comprise a port rifle-drilled into a solid axle, such as a solid trailer axle or a truck steer axle. In yet further embodiments, such as with unsealed axles, a stator may be non-sealingly mounted in the axle end, and sealingly coupled to fluid conduit 46 (FIG. 7). In the embodiment of FIG. 7, a stator 800 may be mounted at the end of a hollow or drilled axle (not shown), such as by a press plug 802 or other suitable sealing or nonsealing plug or support, or by friction fit or threads, for example. A fluid conduit 46 may sealingly couple the stator 800, such as with a Prestolok™ fitting 804, to a fluid pressure source. The stator 800 may define an opening 806 in which a rotor assembly tube (not shown) may be sealingly inserted. Such sealing insertion may be accomplished, for example, by an annular sealing member (not shown) disposed about an inner diameter of the stator opening 806 in a manner similar to that shown in FIG. 2.

As may be further seen in FIG. 2, the rotor assembly 20 may comprise a tube 22 and a rotor body 208. The rotor body 208 may comprise a threaded portion 208a that may be used to mount the rotor assembly to a hubcap having matching threads. In the embodiment of FIG. 2, the threaded portion 208a is shown as NPT threads. However, straight and other threads may be used as well. Of course, any other suitable mounting means may be provided, such as keys and slots, friction fit, adhesive, crimping, and the like. The rotor body 208 may comprise a fluid chamber 209. The tube 22 may be assembled to the rotor body 208 by a telescope cap 212. The telescope cap 212 may be mounted to the rotor body 208 by any suitable means, such as friction fit, screw threads, adhesive or crimping, etc. The tube 22 may comprise a flared end 210 that may be disposed within the fluid chamber 209. The flared end 210 may prevent the tube 22 from sliding out of the telescope cap 212. A bearing 214 may be disposed between a lip 216 of the rotor body 208 and the flared end 210 of the tube 22. The bearing may comprise any suitable material, such as graphite, nylon, oilite, Delrin, brass or any other material suitable for reducing wear or friction between the tube 22 and the rotor body 208. The tube 22 may be sealed to the rotor body 208 by an annular seal 218. The annular seal 218 may be an o-ring, lip seal or any other suitable seal configuration, and may comprise a variety of materials, such as rubber, silicone, nylon, oilite or graphite. The tube 22 may rotate within either or both of the annular seals 206 and 218.

The tube 22 may comprise any suitable material or combination of materials, and may be rigid, flexible, or both. For example, tube 22 may comprise steel, brass, nylon, polycarbonate, acrylic, rubber, or any combination thereof. For example, the flared end 210 of the tube 22 may comprise a steel tubular portion, and the stator end 220 may comprise a nylon tubular portion, and the nylon and steel portions may be coupled by any suitable means, such as a compression ring, screw threads, adhesive, friction fit, Presto-Lok fittings, and the like. A rigid tube may pivot within and/or translate through either or both of the annular seals 206 and 218, thus accommodating misalignment between the hub and axle, e.g., as may result from bearing play. A tube that is wholly or partially flexible may accommodate such misalignment by flexing. In some embodiments, the friction between annular seal 206 and the tube may be different from the friction between annular seal 218 and the tube, thus allowing the tube to rotate at a different speed than the hubcap. In some embodiments, the friction between an annular seal 206 or 218 may be sufficient to prevent rotation of the tube in such seal, which may result in the tube either rotating as fast as the hubcap (i.e., the tube will not rotate with respect to the hubcap), or not rotating at all (i.e., the tube is stationary with respect to the hubcap).

In further embodiments, one or more additional annular seals may be disposed in the stator 18, such as adjacent annular seal 206. Similarly, one or more additional annular seals may be disposed in the rotor body 208, such as adjacent annular seal 218.

Figure 3:
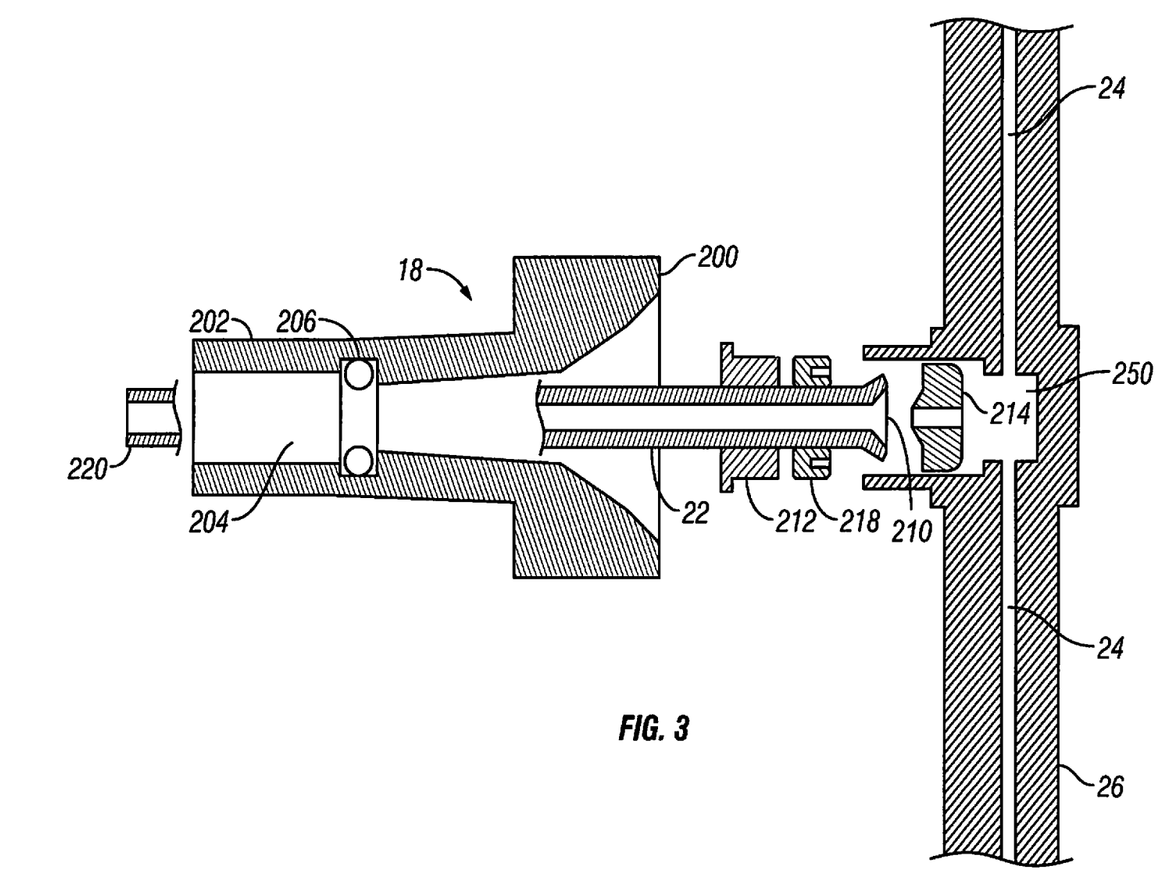
FIG. 3 illustrates a detailed view of an embodiment of a rotary union.

FIG. 3 illustrates an embodiment of a rotor assembly for which the hubcap 26 is configured to serve as a rotor body. A hubcap 26 may comprise a fluid chamber 250 from which fluid channels 24 may radiate. A tube 22 may be disposed in the fluid chamber 250, and retained by a telescope cap 212 mounted to the hubcap 26. An annular seal 218 may provide a sealing interface between the tube 22 and the hubcap 26. A bearing 214 may be disposed between the flared end 210 of the tube and the hubcap 26. Pressurizing fluid may flow from the stator 18 through the tube 22 and into the hubcap fluid chamber 250, and from the fluid chamber 250 to the one or more fluid channels 24.

Figure 4:
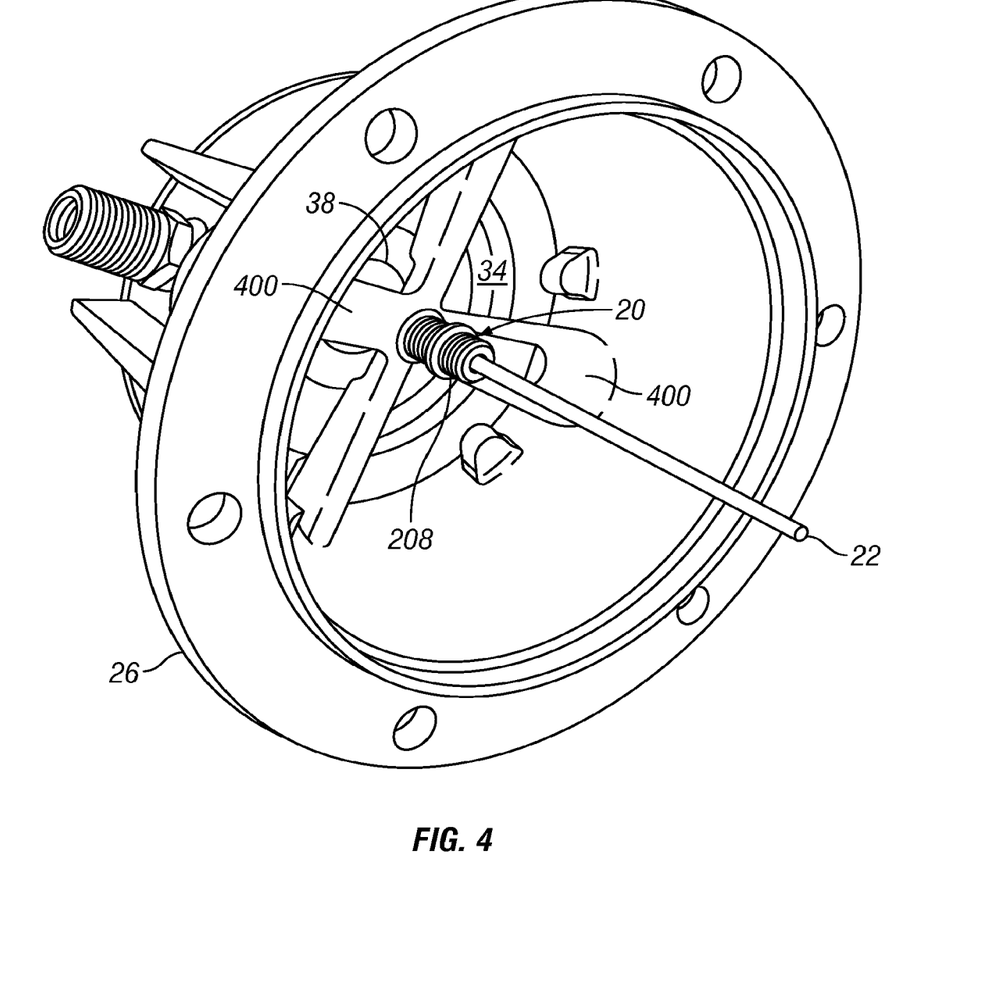
FIG. 4 illustrates a perspective view of the embodiment of FIG. 1.
Figure 5:
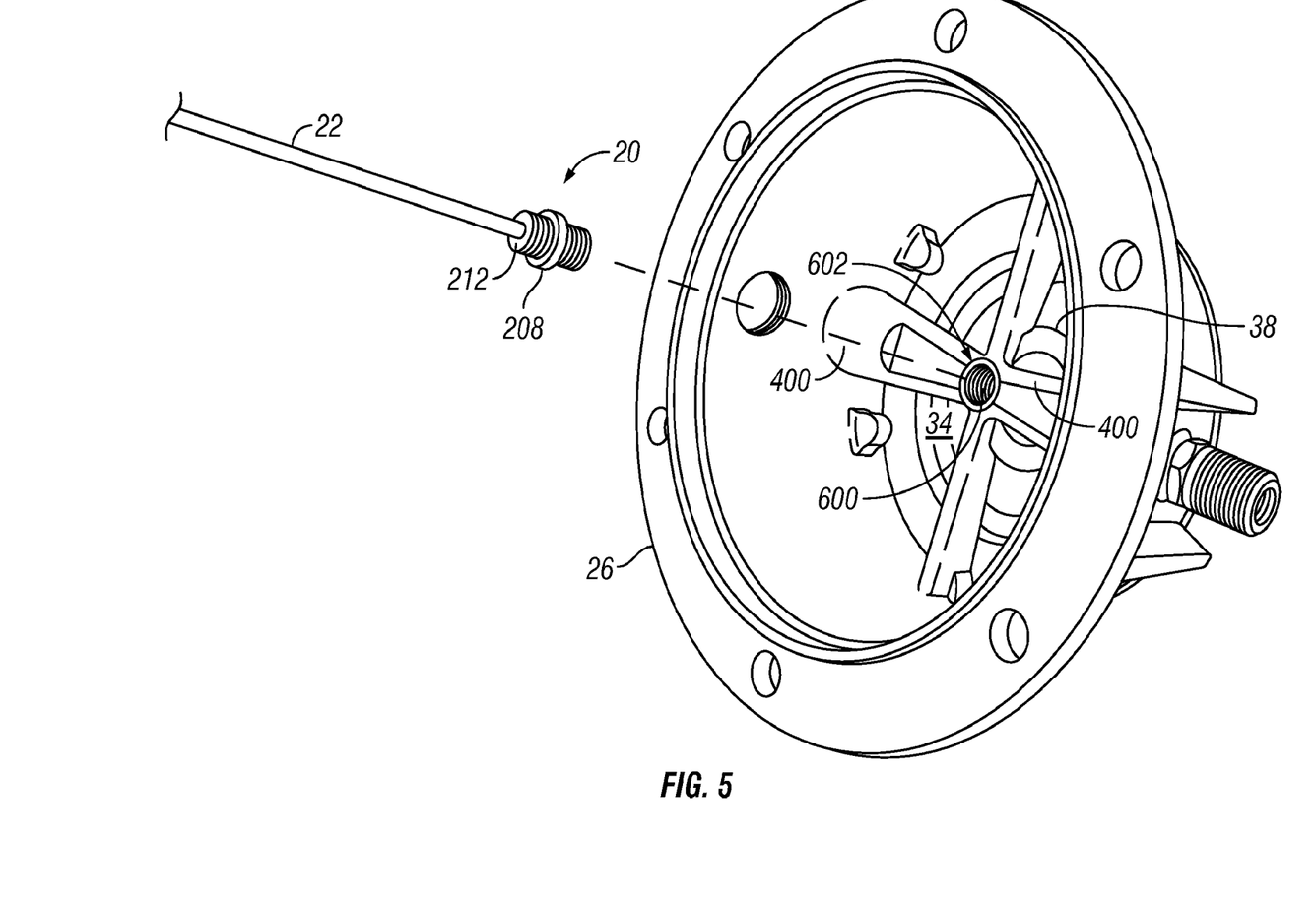
FIG. 5 illustrates an "exploded" view of FIG. 4.

FIG. 4 illustrates an embodiment of a rotor assembly 20, such as the embodiment of FIG. 2, mounted to a hubcap 26. Fluid channels 24 (not shown) may be provided through radial bosses 400. A rotor body 208 may be threadably mounted to the hubcap. A sight glass 34 may have a plug or vent 38 mounted thereto. FIG. 5 illustrates an exemplary threaded port 600 of a fluid chamber 602 in which a rotor assembly 20 may be threadably mounted, and further shows the rotor assembly 20 of FIG. 4 disassembled, or "exploded," from a hubcap 26.

Figure 6:
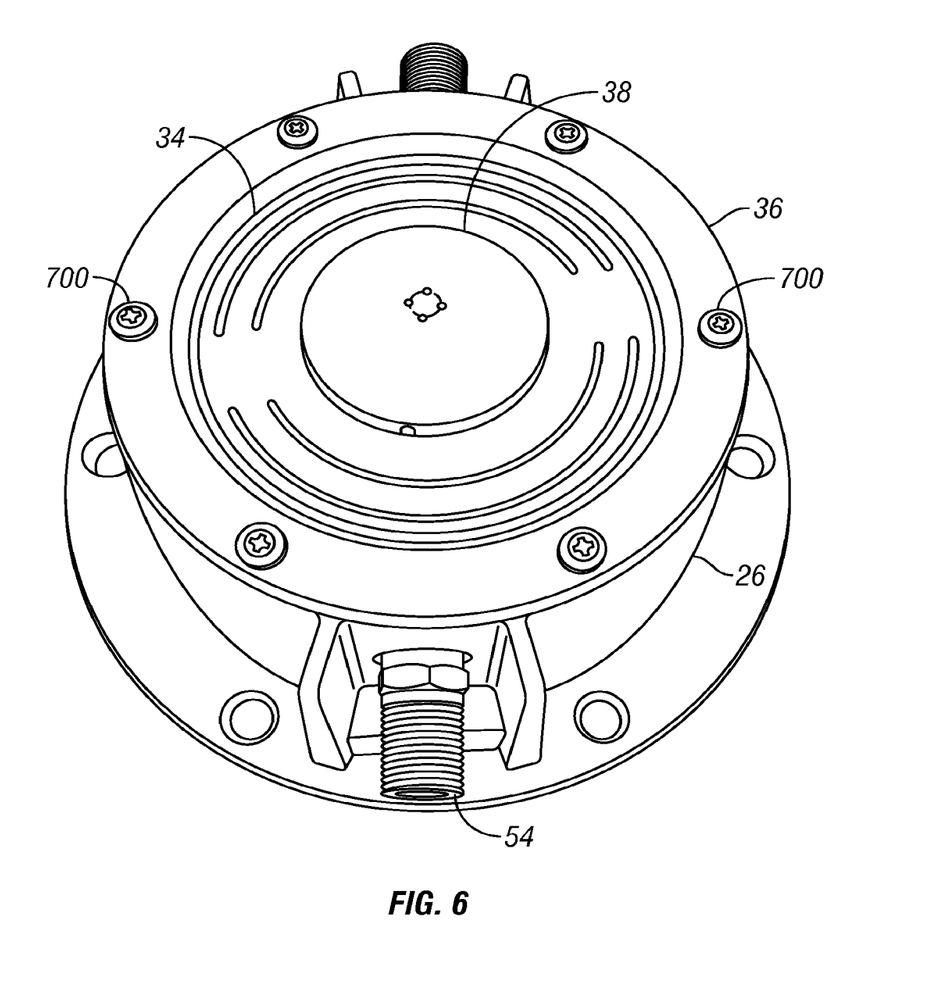
FIG. 6 illustrates a detailed view of an embodiment of an example hubcap.

FIG. 6 illustrates a hubcap 26 and various parts thereof, including a retainer ring 36, sight glass 34, plug or vent 38, screws 700 for mounting the retainer ring to the hubcap 26 and a hose fitting 54.

Figure 8:
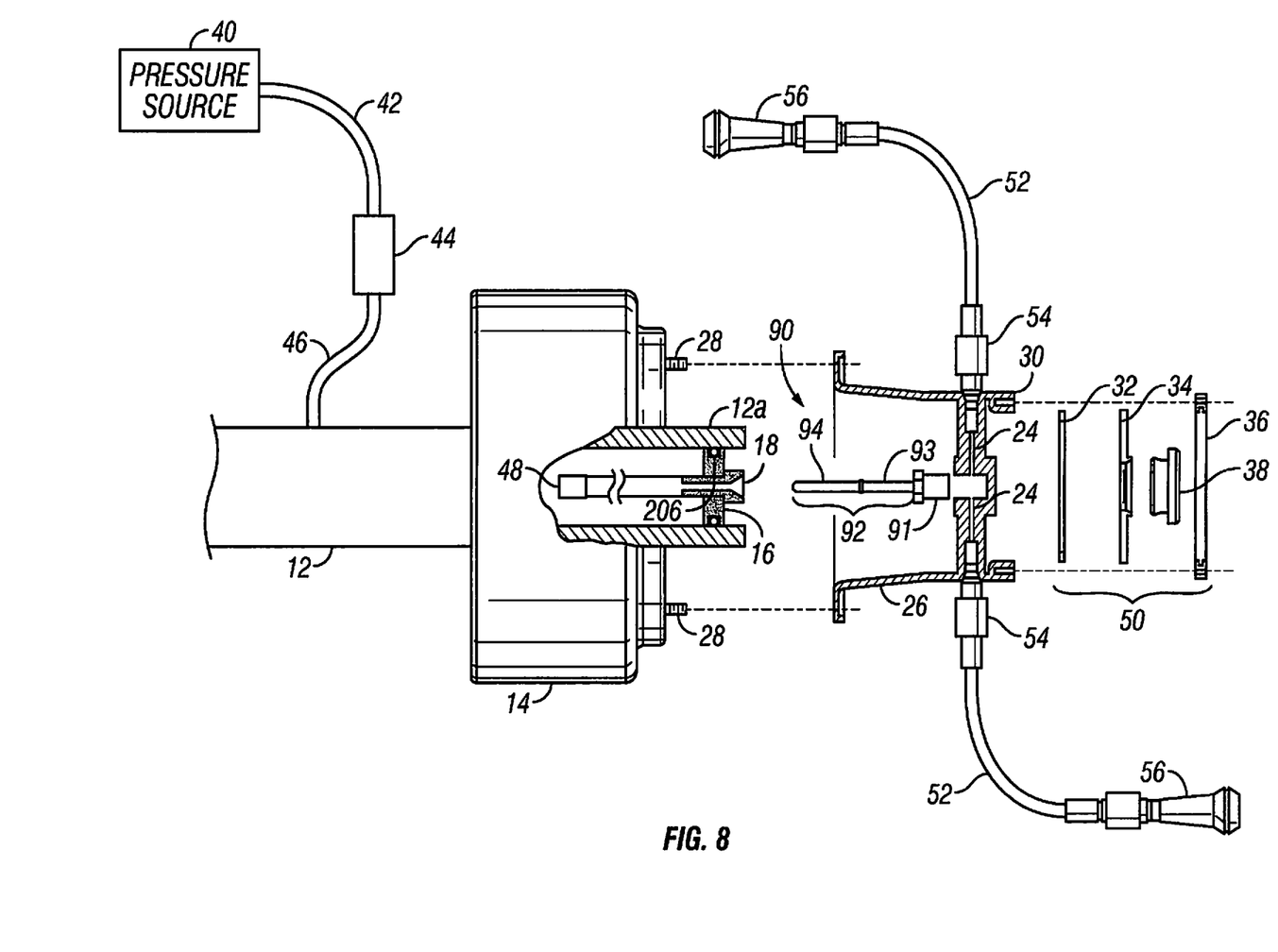
FIG. 8 illustrates an embodiment of a rotary union for a tire inflation system.

As may be seen in FIG. 8, a tubular extension 90 may be removably mounted to the hubcap 26. As so mounted, the tubular extension 90 may be substantially fixed against rotation with respect to the hubcap 26. In some embodiments, the tubular extension 90 may comprise a threaded portion 91 for threadable engagement with the hubcap 26. The tubular extension 90 may comprise tube 92 having a flexible portion 93 and a rigid portion 94, as described above. In other embodiments, the tubular extension 90 may comprise an entirely flexible tube or an entirely rigid tube. In yet other embodiments, the flexible and rigid portions of the tube 92 may be reversed: the portion 93 may be rigid and the portion 94 may be flexible. The portion 93 of the tube 92 may be inserted into a stator 18, such as the stator described in connection with FIG. 2. In such an embodiment, a rotary union sealing interface may be formed by the rigid portion 93 and an annular seal, such as o-ring 206. The tube 92 may translate, rotate and/or pivot within the annual annular seal 206 in the stator, depending on the configuration of the tube 92.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

I claim:

1. A rotary union comprising:
   a stator configured for disposition in a vehicle axle, the stator having a first fluid channel disposed therethrough and configured for sealing communication of pressurized fluid;
   a first annular seal disposed within the first fluid channel;
   a rotor body having a second fluid channel disposed therethrough and configured for sealing communication of the pressurized fluid, the rotor body being configured for removable mounting to and enclosure in the interior of a hubcap, the hubcap forming a third fluid channel disposed in the hubcap and extending from the interior of the hubcap to an exterior surface of the hubcap, the third fluid channel configured for sealing communication of the pressurized fluid, the rotor body being configured for sealed mounting to the third fluid channel such that the second fluid channel is placed in sealed fluid communication with the third fluid channel when the rotor body is mounted to the hubcap;
   a second annular seal disposed within the rotor body in the second fluid channel; and
   a tube sealingly, rotatably and pivotably disposed in the first annular seal and sealingly, rotatably and pivotably disposed in the second annular seal so as to provide sealed fluid communication between the first fluid channel of the stator and the second fluid channel of the rotor body, the tube being further translatably disposed in the first annular seal such that the tube may translate out of and disengage from the first annular seal;
   wherein when the rotor body is mounted to the third fluid channel and the tube is disposed in the first annular seal, the pressurized fluid may flow from the first fluid channel through the tube to the second fluid channel, and from the second fluid channel to the third fluid channel.

2. The rotary union of claim 1, wherein the tube is rigid.

3. The rotary union of claim 1, wherein the tube is flexible.

4. The rotary union of claim 1, wherein the tube comprises a flexible portion and a rigid portion.

5. The rotary union of claim 1, wherein the first annular seal comprises an o-ring and the second annular seal comprises a lip seal.

6. The rotary union of claim 1, wherein the first annular seal comprises a lip seal and the second annular seal comprises an o-ring.

7. The rotary union of claim 1, wherein the first annular seal and the second annular seal each comprise an o-ring.

8. The rotary union of claim 1, wherein the tube may rotate in the first annular seal and in the second annular seal.

9. The rotary union of claim 1, wherein the tube may rotate in the first annular seal but not in the second annular seal.

10. The rotary union of claim 1, wherein the tube may not rotate in the first annular seal but may rotate in the second annular seal.

11. The rotary union of claim 1 further comprising a telescope cap disposed about the tube and fitted to the rotor body to retain the tube in the rotor body.

12. The rotary union of claim 11 wherein one end of the tube is flared to so as to prevent translation of such end through the second annular seal and telescope cap.

13. The rotary union of claim 1, wherein the rotor body may threadably mount to the interior of the hubcap.

14. A rotary union cartridge comprising:
    a rotor body having a first fluid channel disposed therethrough, the rotor body being configured for removable mounting to and full enclosure in the interior of a hubcap having a second fluid channel formed therein, the rotor body being configured for sealed mounting to the second fluid channel such that the first fluid channel is placed in sealed fluid communication with the second fluid channel when the rotor body is mounted to the hubcap;
    a first annular seal disposed in the first fluid channel; and
    a tube having a first end sealingly, rotatably and pivotably disposed in the first annular seal, the tube having a second end configured to sealingly, rotatably and pivotably engage a second annular seal.

* * * * *